United States Patent [19]

Beauvais

[11] Patent Number: 5,437,494

[45] Date of Patent: Aug. 1, 1995

[54] REARWARD MOVING SEAT

[75] Inventor: Randall R. Beauvais, Fenton, Mo.

[73] Assignee: Life Force Associates, L.P., Imperial, Mo.

[21] Appl. No.: 968,108

[22] Filed: Oct. 29, 1992

[51] Int. Cl.$^6$ .............................................. B60N 2/42
[52] U.S. Cl. .......................... 297/216.19; 297/216.16; 297/216.1
[58] Field of Search ........... 297/216.1, 216.16, 216.19, 297/216.18, 216.2, 341, 342, 344.1; 296/68.1

[56] References Cited

U.S. PATENT DOCUMENTS 5,167,421 12/1992 Yunzhao ....................... 297/216.18

Primary Examiner—Kenneth J. Dorner
Assistant Examiner—Milton Nelson, Jr.
Attorney, Agent, or Firm—Kenyon & Kenyon

[57] ABSTRACT

A seat for supporting a passenger in a vehicle comprises a seat base including front and rear portions. The seat base is coupled to the vehicle such that, upon a predetermined acceleration of the vehicle, the seat base moves rearward away from a rest position with the front portion of the seat base moving along a first predetermined path and the rear portion of the seat moving along a second predetermined path. The first and second paths are oriented such that, as the seat base travels further from the rest position, the elevation of the rear portion of the seat base increases relative to the elevation of the front portion of the seat base.

16 Claims, 19 Drawing Sheets

REARWARD MOVING SEAT

FIELD OF THE INVENTION

This invention relates to a seat for supporting a passenger in a vehicle and, more specifically relates to a seat at least a portion of which moves in response to a predetermined acceleration of the vehicle.

BACKGROUND OF THE INVENTION

Issues concerning passenger safety have become increasingly important as the speed of the vehicles transporting these passengers has increased. Over time, the most significant source of passenger injuries has involved the rapid deceleration of the vehicle due to a frontal collision.

In an attempt to reduce injuries due to frontal vehicle collisions, several devices are known which allow the vehicle seat to move in response to the sudden deceleration of the vehicle.

U.S. Pat. No. 5,022,707, issued to Beauvais et al., discloses an improved passenger restraint apparatus wherein, in response to deceleration of the vehicle, the seat moves such that both a forward and a rearward portion of the seat move forward and upward with the forward portion of the seat moving upward faster than the rearward portion of the seat. This specific seat motion provides enhanced passenger restraint for frontal collision over the prior devices including moving seats.

However, collisions from the rear of the vehicle are also common and can cause serious injuries. And, as the orientation of the passenger and of the passenger support with respect to a given acceleration has a profound impact upon the effectiveness of any device designed to restrain the passenger, devices designed to respond to frontal collisions are not easily adapted to use in rear collision situations. This is true as, in most vehicles, the orientation of the passengers and the passenger supports (the seats) is highly asymmetric relative to the front and rear of the vehicle.

In a forward collision, the most significant problems which a restraint device is designed to eliminate are the pitching forward of the upper body, and the consequent contact between the passenger's head and the dash, the steering wheel, the windshield or the front seat backs, and submarining of the passenger.

However, in a rearward collision the primary concerns are neck whip, excessively forceful or improperly oriented contact with a head restraint, ramping up the seat back and ejection backward over or, in the case of collapse of the seat, through the seat back.

In addition, the anatomical characteristics of the front and rear surfaces of a human being are substantially different. Therefore, those contact areas which are suitable for restraining the passenger in the event of a rear collision are quite different from those suitable for restraining the passenger in the event of a frontal collision.

Thus there is a need for a device which provides effective passenger restraint and which is effective for collisions from the rear of the vehicle.

SUMMARY OF THE INVENTION

A seat for supporting a passenger in a vehicle according to the present invention provides a seat base including front and rear portions, wherein the seat base is coupled to the vehicle such that, upon a sudden acceleration of the vehicle of a magnitude greater than a predetermined threshold level, the seat base moves rearward away from a rest position and, as the seat base moves rearward, the front portion of the seat base moves along a first predetermined path and the rear portion of the seat moves along a second predetermined path. The first and second paths are oriented such that, as the seat base travels further from the rest position, the elevation of the front portion of the seat decreases relative to the elevation of the rear portion of the seat.

An additional embodiment of the present invention is directed to a seat including a seat back having a pivot point located along the length of the seat back. The seat back bends about this point and rotates forward about a lower portion of the seat back which is coupled to a seat base. This device also includes means for tightening a seat belt about a passenger upon the sudden acceleration of the vehicle.

A further embodiment of the present invention includes a stationary seat base releasably coupled to a movable seat back to cradle and restrain the passenger in the event of collision from the rear of the vehicle.

A further embodiment of the present invention includes a seat wherein the first path is oriented such that the front portion of the seat base moves substantially horizontally as the seat base moves further from the rest position.

Finally, a further embodiment of the present invention comprises a seat base including front and rear portions, wherein the seat base is coupled to the vehicle such that, upon the sudden acceleration of the vehicle, the seat base moves rearward away from a rest position so that the front portion of the seat base moves along a path extending substantially linearly downward, and wherein the rear portion of the seat moves along a path extending substantially elliptically upward.

DETAILED DESCRIPTION

Figure 1:
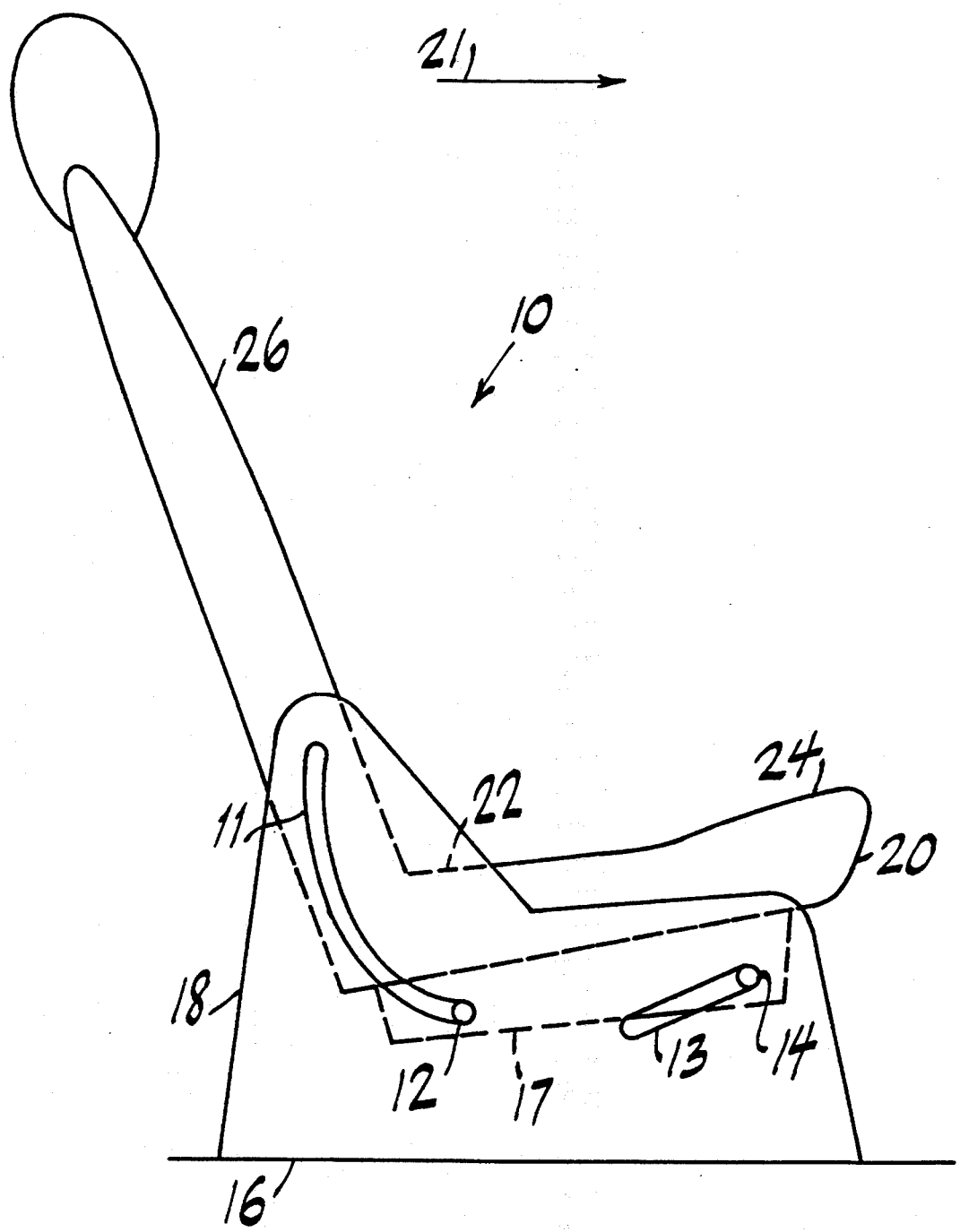
FIG. 1 shows a side view of a seat according to a first embodiment of the present invention wherein the seat is in an initial rest position.
Figure 2:
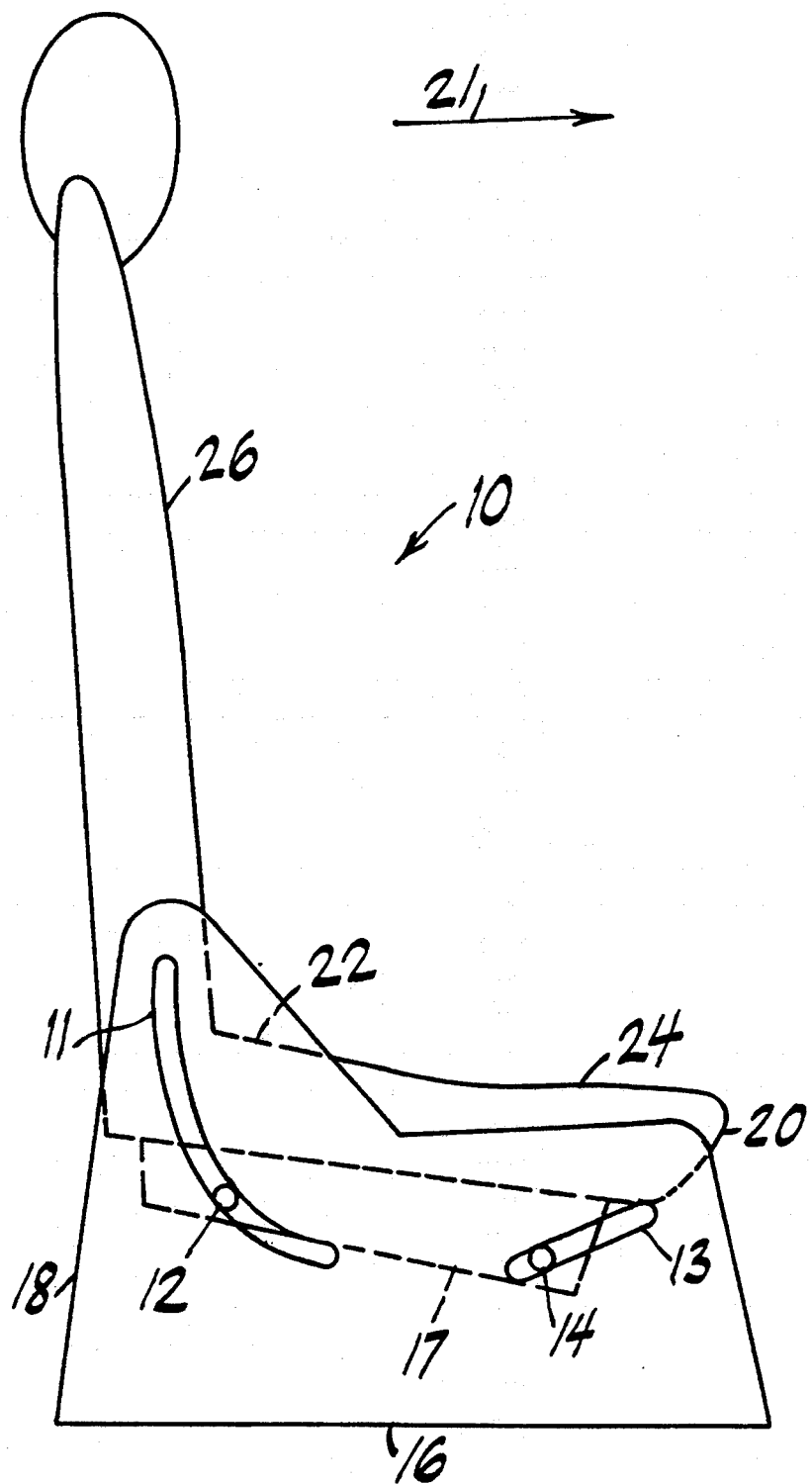
FIG. 2 shows a side view of a seat according to the first embodiment of the present invention wherein the seat is in a second position responsive to a sudden acceleration of the vehicle.

Referring to FIGS. 1 and 2, a seat according to a first embodiment of the present invention is indicated generally by the numeral 10. The seat 10, which includes a seat base 20 and a seat back 26, is mounted on a vehicle frame 16. A member 18 is mounted on the frame 16. The member 18 includes two slots 11 and 13 formed therein. The slot 11, which extends upward and rearward from a forward end, may be formed in the shape of a portion of any conic section but is preferably a portion of an ellipse. This ellipse preferably has a semi-major axis of approximately 200 mm and a semi-minor axis of approximately 135 mm. The slot 13 extends downward and rearward from a forward end and may be linear, as shown in FIG. 1, or in the shape of a portion of a conic section. Although the slot 13 is shown extending downward, positive results have been obtained in testing with a slot 13 oriented at angles in the range between 40° below the horizontal and 10° above the horizontal. However, it is expected that positive results may be obtained with a slot oriented at angles outside either of the limits of this range. The slot 13 is preferably oriented such that it extends downward at an angle of approximately 20° below the horizontal. The seat base 20 is coupled to a member 17 which is coupled to two pins 14 and 12, respectively. The pin 14 is movably mounted within the slot 13 and the pin 12 is movably mounted within the slot 11. In order to achieve the desired seat motion, for a slot 13 oriented at an angle at or above the horizontal, the slot 11 is oriented such that the rate of ascent of the pin 12 in the slot 11 is greater than the rate of ascent of the pin 14 in the slot 13.

Upon the sudden acceleration of the vehicle in the direction of arrow 21, a passenger seated in the seat 10 will exert an inertial force on the seat 10 in a direction opposite the arrow 21. This force urges the seat 10 to move rearward and, consequently, pins 12 and 14 are moved rearwardly in slots 11 and 13, respectively. As the pins 12 and 14 move further from their initial positions at the forward ends of slots 11 and 13, respectively, the front portion 24 of the seat base 20 moves rearward and downward while the rear portion 22 of the seat base 20 moves rearward and upward. Therefore, the seat 10 moves rearward and rotates clockwise, as seen in FIG. 2, in response to the sudden acceleration of the vehicle in the direction of arrow 21, thereby restraining and cradling the passenger.

Figure 3:
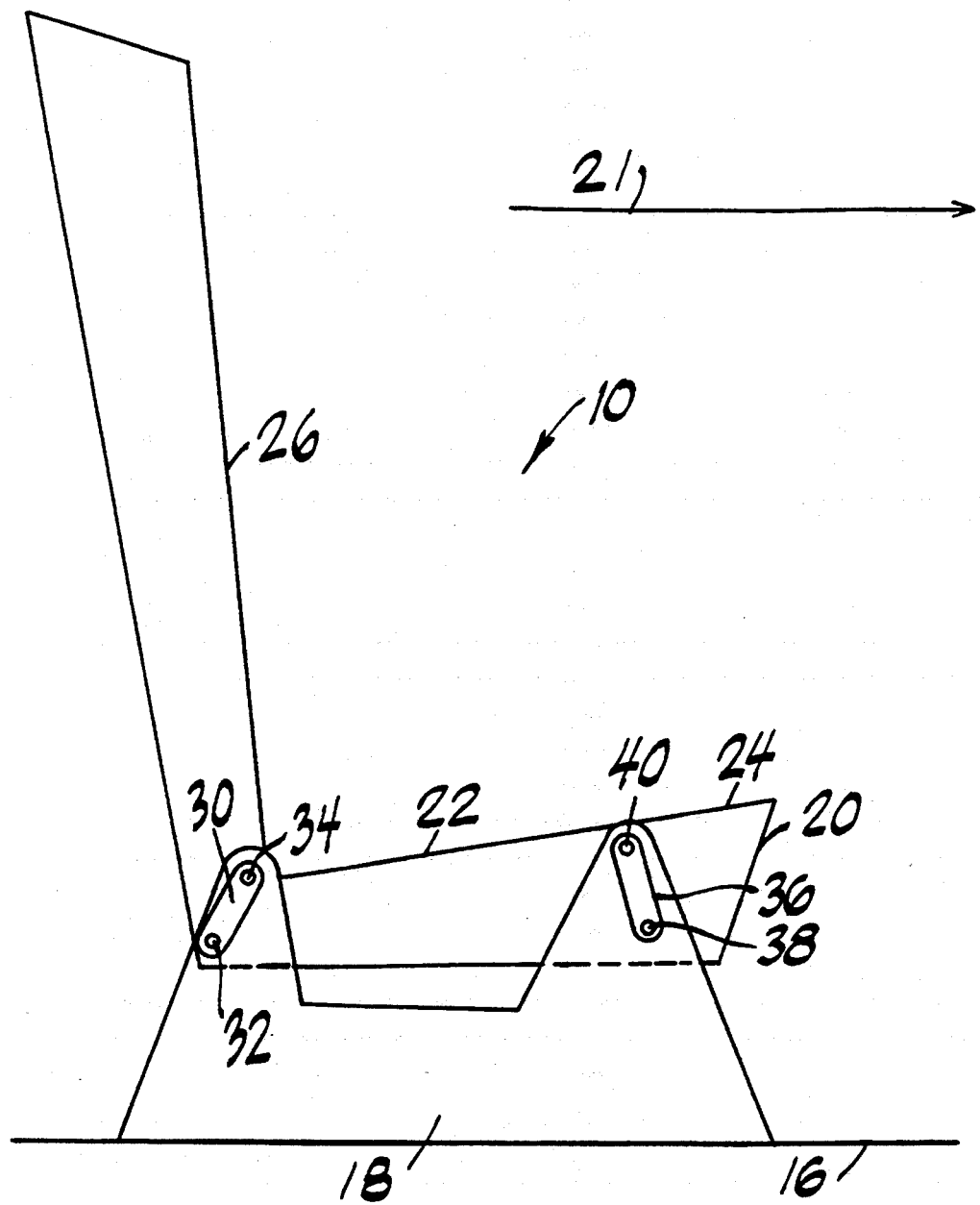
FIG. 3 hows a side view of a seat according to a second embodiment of the present invention wherein the seat is in an initial rest position.
Figure 4:
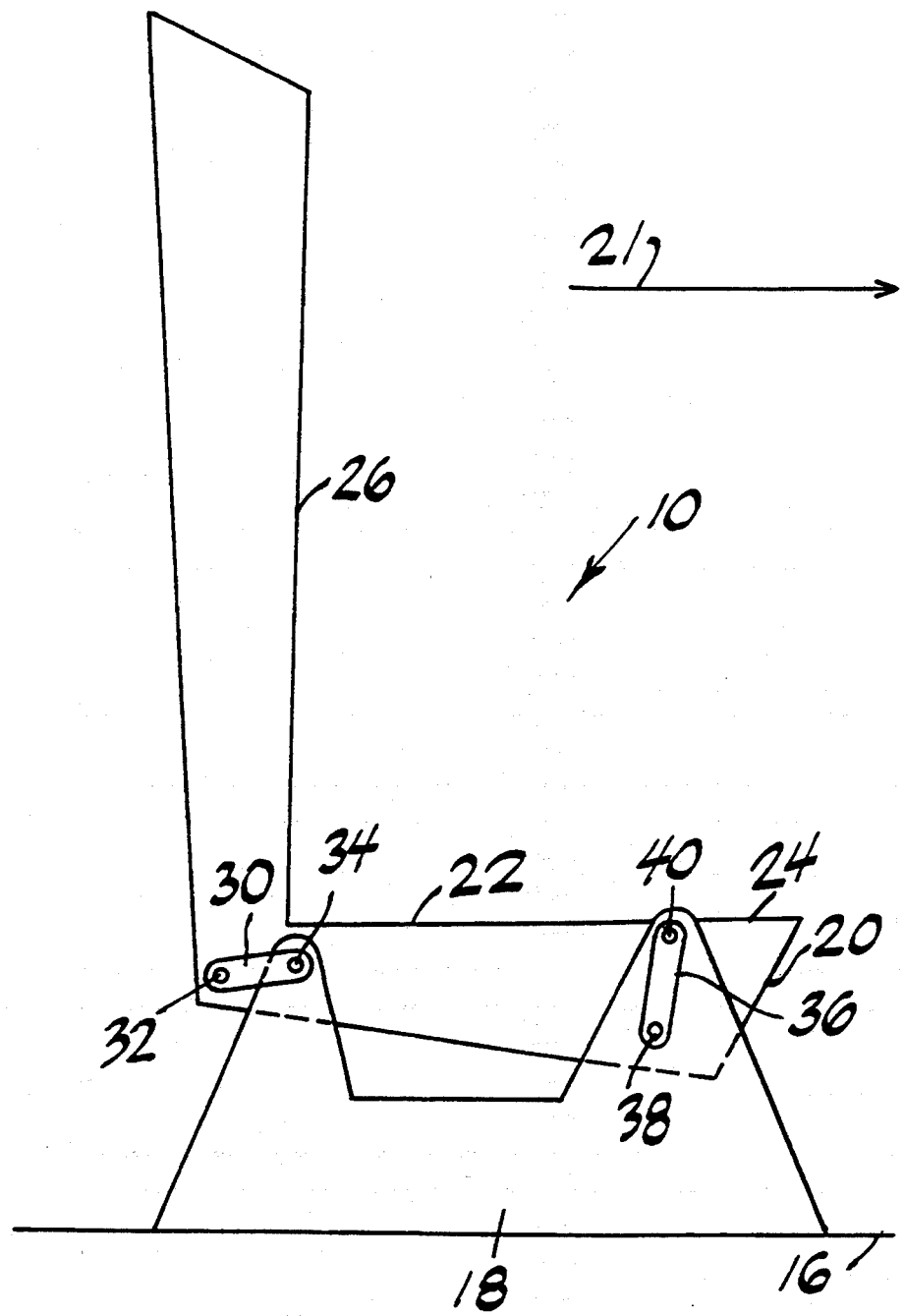
FIG. 4 shows a side view of a seat according to the second embodiment of the present invention wherein the seat is in a second position responsive to a sudden acceleration of the vehicle.

A seat 10 according to a second embodiment of the present invention is shown in FIGS. 3 and 4. One end of a bar 30 is rotatably coupled to the member 18 by a pin 34 and the other end of the bar 30 is rotatably coupled to the rear portion 22 of the seat base 20 by means of a pin 32. A bar 36 is rotatably coupled at one end to the front portion 24 of the seat base 20 by means of a pin 38. The other end of the bar 36 is rotatably coupled to the member 18 by means of a pin 40.

Upon the sudden acceleration of the vehicle in the direction of arrow 21, a passenger seated in the seat 10 will exert an inertial force on the seat 10 in a direction opposite the arrow 21. This force urges the seat 10 to move rearward and, consequently, bars 30 and 36 are rotated clockwise, as seen in FIG. 4, away from an initial rest position about pins 34 and 40, respectively. In the initial rest position, the bar 30 is oriented such that the pin 32 is located further rearward than the pin 34 and the bar 36 is oriented such that the pin 38 is located further forward than the pin 40. Therefore, as the bar 30 rotates about the pin 34, the pin 32 and, consequently, the rear portion 22 moves upward while rotation of the bar 36 causes the pin 38 and the front portion 24 to move downward until the pin 38 is directly below the pin 40. Thereafter, as the length of the bar 36 is greater than the length of the bar 30, and as, at this point, the motion of the pin 32 is in a direction at a greater angle to the horizontal than is the motion of the pin 38, the pin 38 and the front portion 24 move upward at a rate which is less than that of the pin 32 and the rear portion 22, thereby restraining and cradling the passenger.

Figure 5:
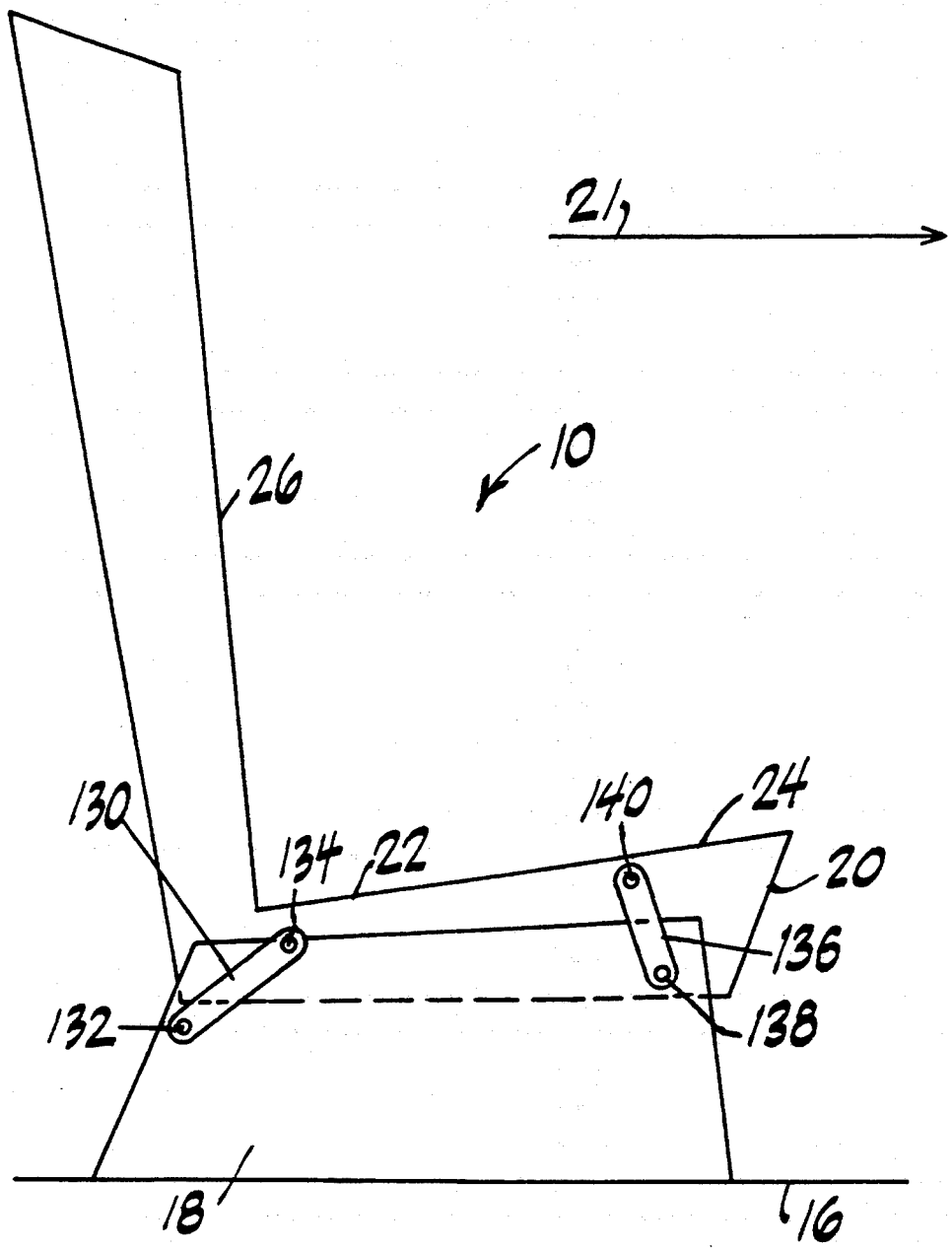
FIG. 5 shows a side view of a seat according to a third embodiment of the present invention wherein the seat is in an initial rest position.
Figure 6:
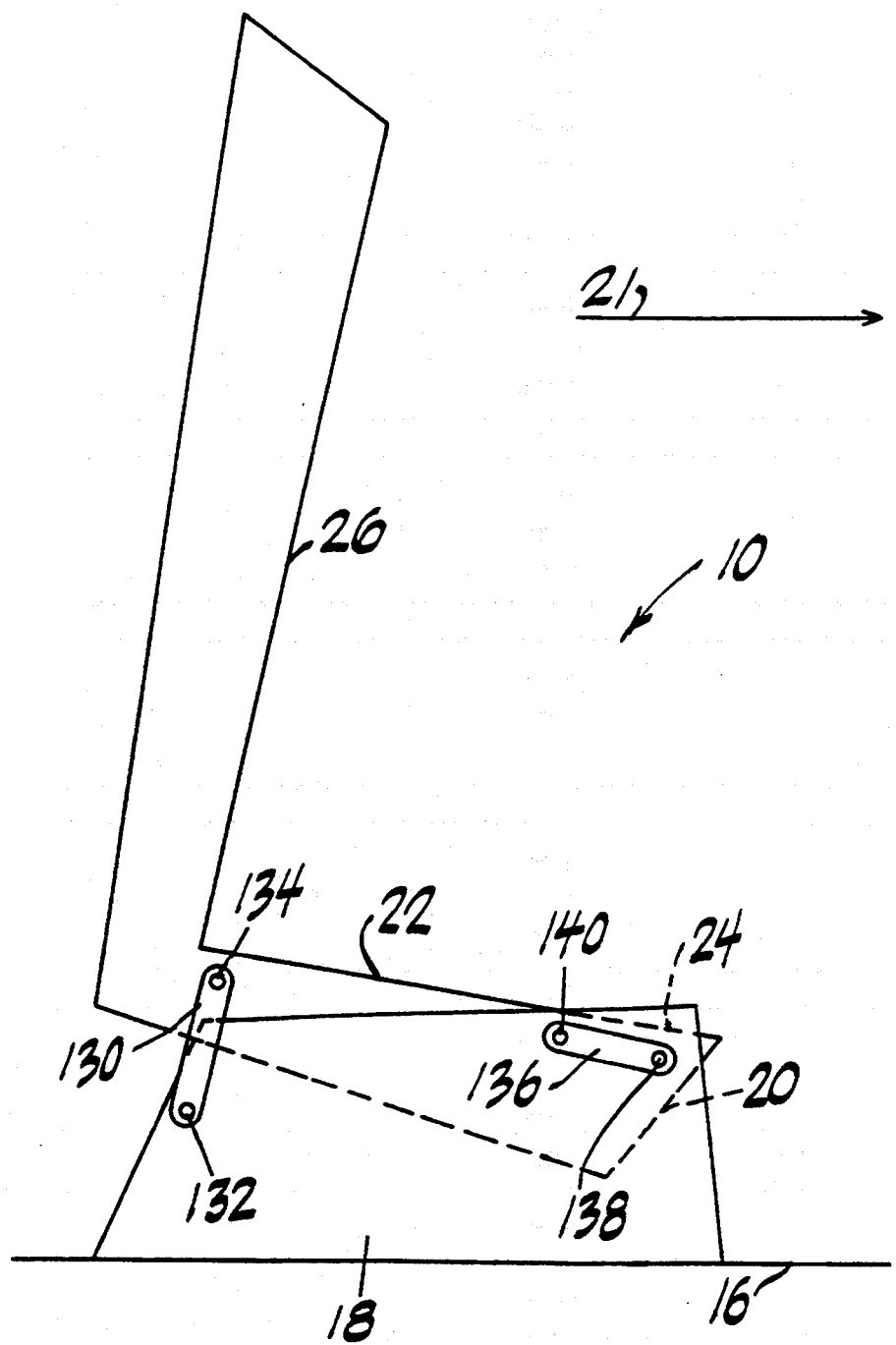
FIG. 6 shows a side view of a seat according to the third embodiment of the present invention wherein the seat is in a second position responsive to a sudden acceleration of the vehicle.

A seat 10 according to a third embodiment of the present invention is shown in FIGS. 5 and 6. One end of a bar 130 is rotatably coupled to the member 18 by a pin 132 and the other end of the bar 130 is rotatably coupled to the rear portion 22 of the seat base 20 by means of a pin 134. A bar 136 is rotatably coupled at one end to the front portion 24 of the seat base 20 by means of a pin 140. The other end of the bar 136 is rotatably coupled to the member 18 by means of a pin 138.

Upon the sudden acceleration of the vehicle in the direction of arrow 21, a passenger seated in the seat 10 will exert an inertial force on the seat 10 in a direction opposite the arrow 21. This force urges the seat 10 to move rearward and, consequently, bars 130 and 136 are rotated counter-clockwise, as seen in FIG. 6, away from an initial rest position about pins 132 and 138, respectively. In the initial rest position, the bar 130 is oriented such that the pin 132 is located further rearward than the pin 134 and the bar 136 is oriented such that the pin 138 is located further forward than the pin 140. Therefore, as the bar 130 rotates about the pin 132, the pin 134 and, consequently, the rear portion 22 moves upward while rotation of the bar 136 causes the pin 140 and the front portion 24 to move downward, thereby restraining and cradling the passenger.

Figure 7:
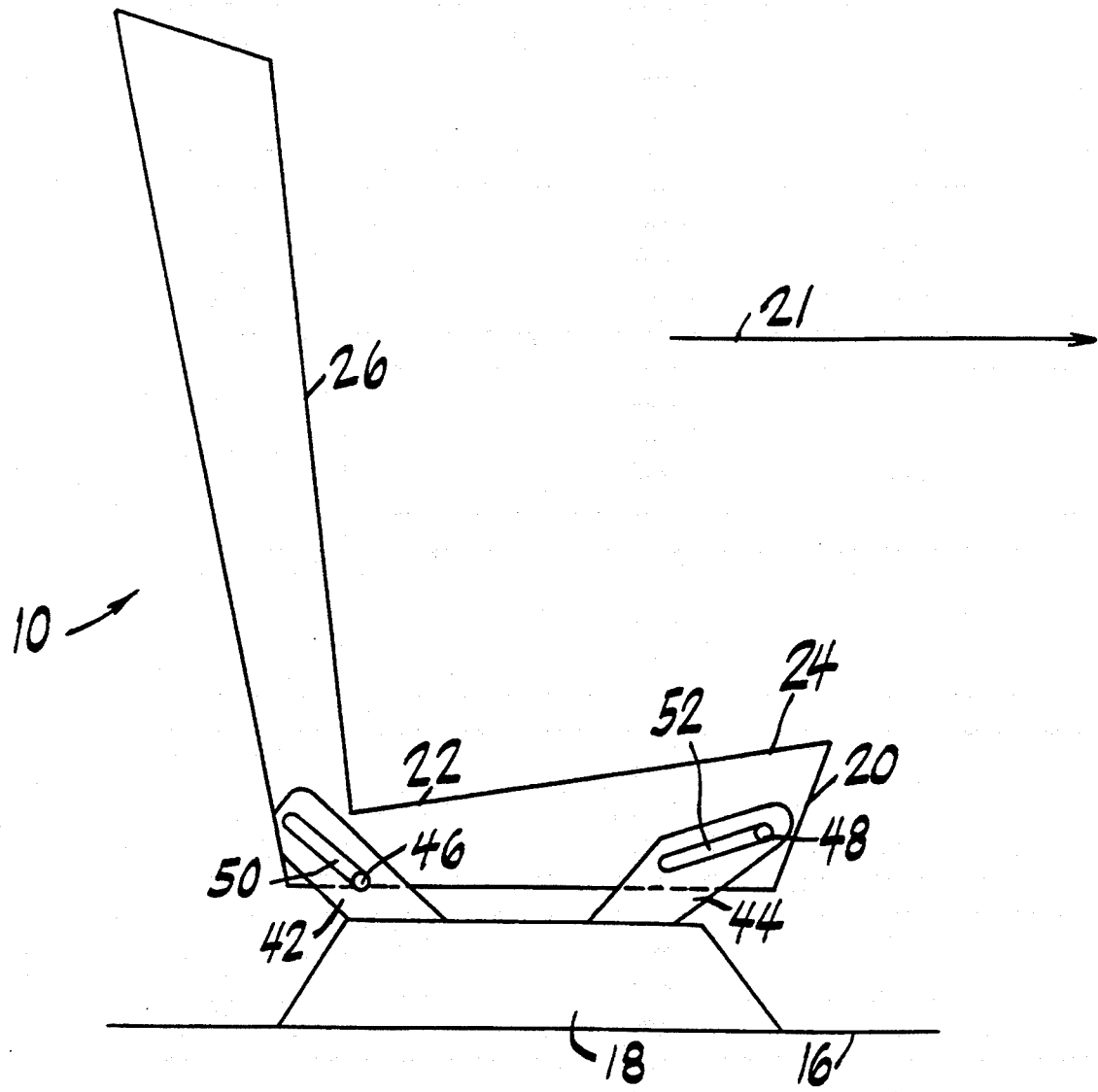
FIG. 7 shows a side view of a seat according to a fourth embodiment of the present invention wherein the seat is in an initial rest position.
Figure 8:
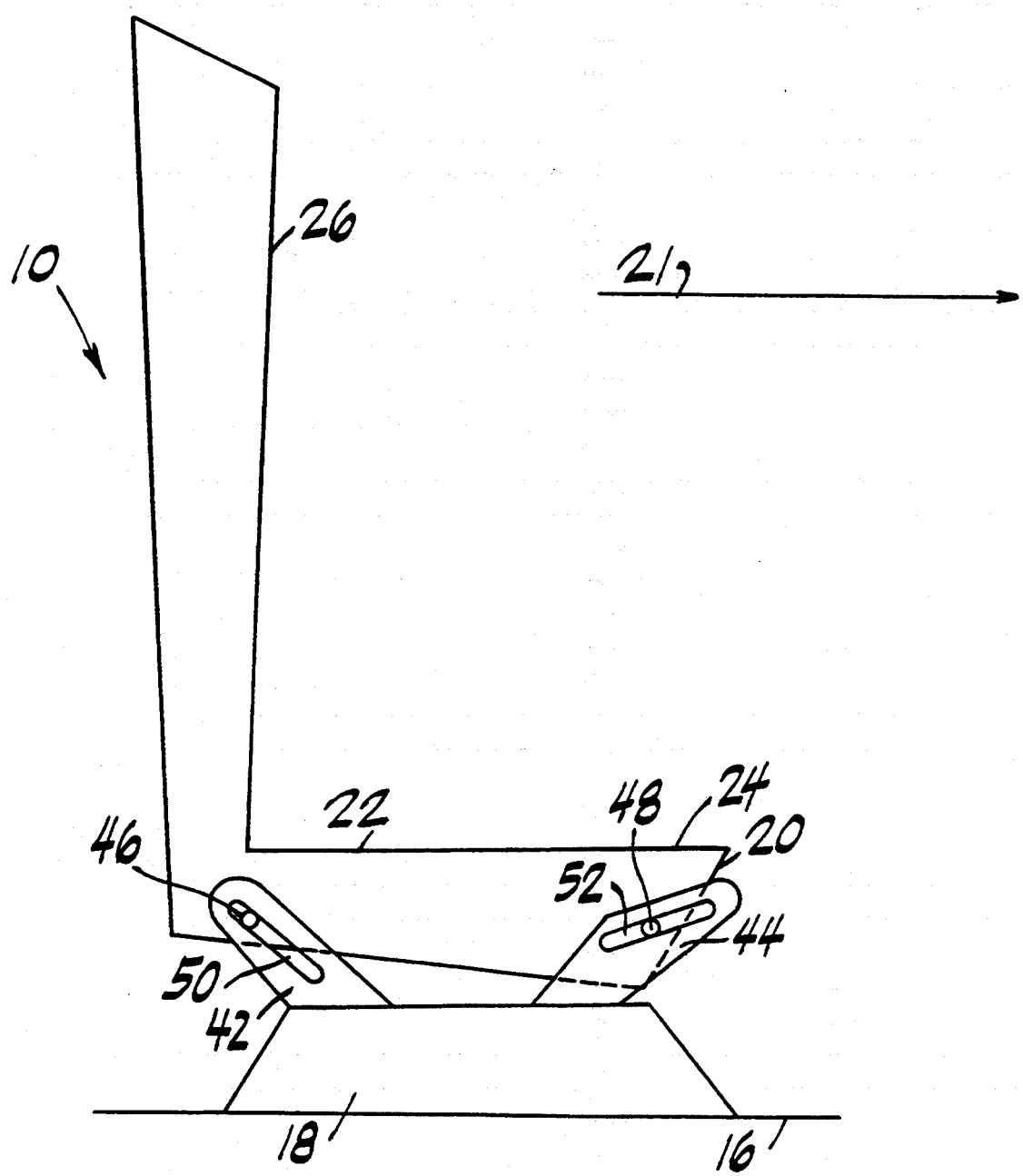
FIG. 8 shows a side view of a seat according to the fourth embodiment of the present invention wherein the seat is in a second position responsive to a sudden acceleration of the vehicle.

A seat 10 according to a fourth embodiment of the present invention is shown in FIGS. 7 and 8. The rear portion 22 of the seat base 20 is coupled to a pin 46 while the front portion 24 is coupled to a pin 48. The pins 46 and 48 are received in slots 50 and 52, respectively, which are formed in arms 42 and 44. Arms 42 and 44 are rigidly coupled to the member 18. The slot 50 is substantially linear and is directed at an angle extending upward away from an initial rest position at an angle in the range between horizontal and 50° above the horizontal while the slot 52 is also substantially linear and extends downward at an angle in the range between the horizontal and an angle of approximately 50° below the horizontal. In addition, the slots 50 and 52 would preferably be oriented such that the difference between their respective angles with the horizontal is within the range of 40° to 70°.

Upon the sudden acceleration of the vehicle in excess of a predetermined threshold magnitude in the direction of arrow 21, a passenger seated in the seat 10 will exert an inertial force on the seat 10 in a direction opposite the arrow 21. This force urges the seat 10 to move rearward and, consequently, the pins 46 and 48 move rearward along slots 50 and 52, respectively. As the pin 46 moves further from the rest position along the slot 50 and the pin 48 moves further from the rest position along the slot 52, the rear portion 22 moves rearward and upward while the front portion 24 moves rearward and downward. This causes the seat 10 to move rearward and rotate clockwise, as seen in FIG. 7, thereby restraining and cradling the passenger.

Figure 9:
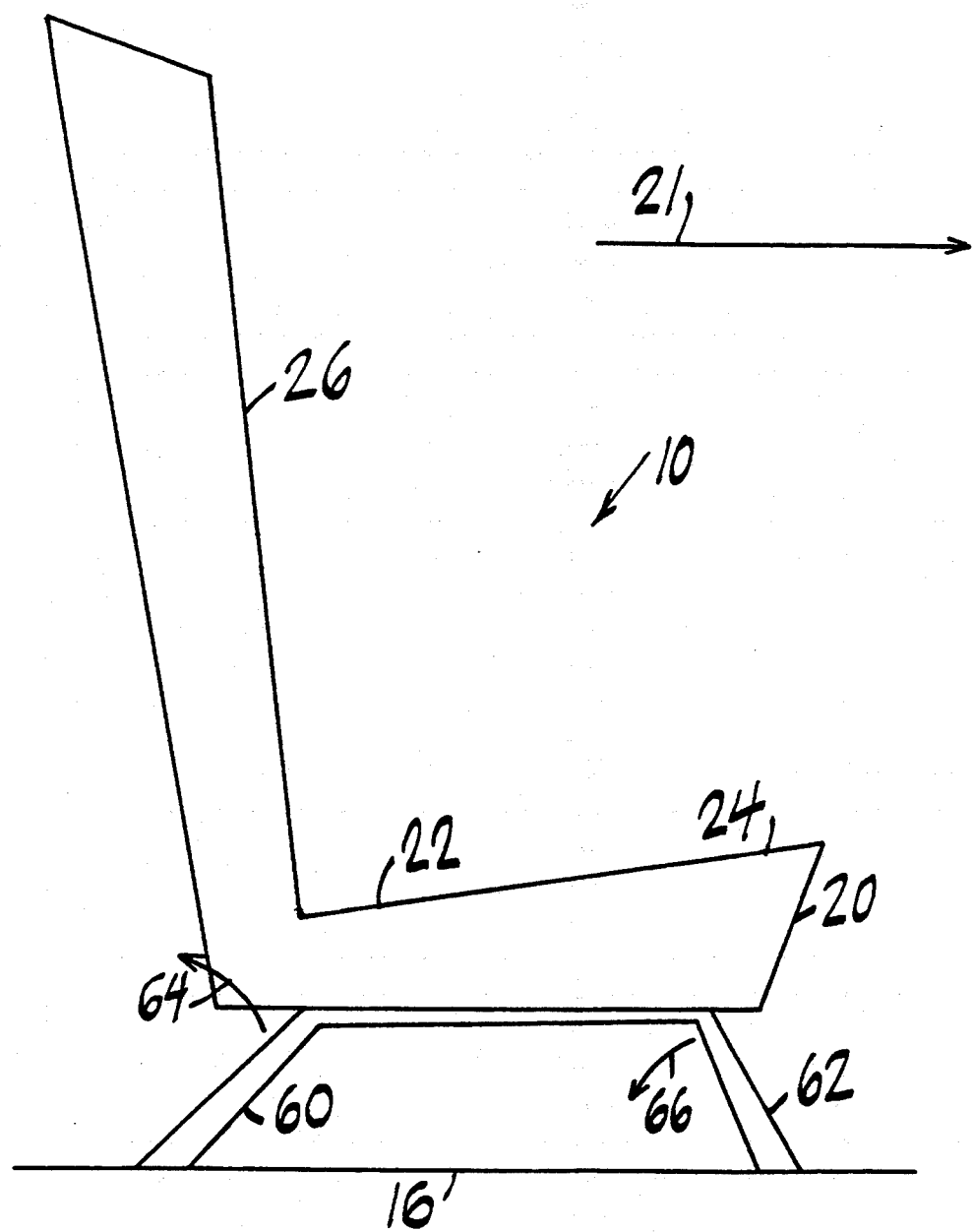
FIG. 9 shows a side view of a seat according to a fifth embodiment of the present invention wherein the seat is in an initial rest position.
Figure 10:
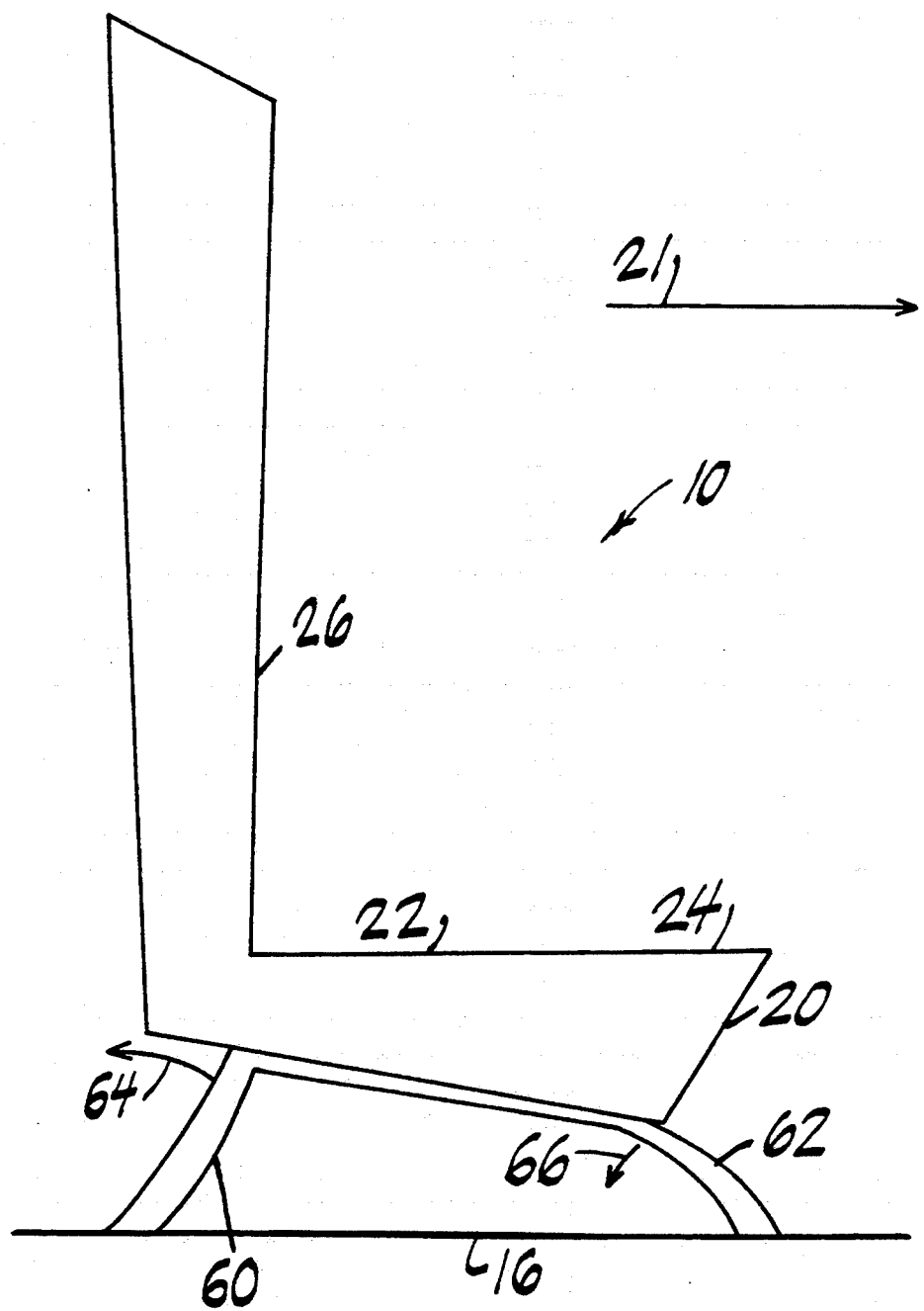
FIG. 10 shows a side view of a seat according to the fifth embodiment of the present invention wherein the seat is in a second position responsive to a sudden acceleration of the vehicle.

A seat 10 according to a fifth embodiment of the present invention is shown in FIGS. 9 and 10. The rear portion 22 of the seat base 20 is coupled to an upper end of a first deformable member 60 while the front portion 24 is coupled to an upper end of a second deformable member 62. The lower ends of the first and second deformable members 60 and 62, respectively, are coupled to the frame 16. As is known in the art, the first deformable member 60 is constructed such that, when subjected to a predetermined force in a direction opposite arrow 21, it will bend about the point at which it is attached to the frame 16 with the upper end of the first deformable member 60 moving upward and rearward along a first predetermined path indicated by arrow 64. The second deformable member is constructed such that, when subjected to a predetermined force in a direction opposite arrow 21, it will bend about the point at which it is attached to the frame 16 with the upper end of the second deformable member 62 moving downward and rearward along a second predetermined path indicated by arrow 66. The first and second members are preferably constructed such that the motion of the seat according to the fifth embodiment of the present invention is within the preferred range of motion for the previously described embodiments.

Upon the sudden acceleration of the vehicle in excess of a predetermined threshold magnitude in the direction of arrow 21, a passenger seated in the seat 10 will exert an inertial force on the seat 10 in a direction opposite the arrow 21. This force urges the seat 10 to move rearward and, consequently, the first and second deformable members 60 and 62, respectively, move rearward along the first and second predetermined paths, respectively. As the upper end of the first deformable member 60 moves further from the rest position along the first predetermined path and the upper end of the second deformable member 62 moves further from the rest position along the second predetermined path, the rear portion 22 moves rearward and upward while the front portion 24 moves rearward and downward. This causes the seat 10 to move rearward and rotate clockwise, as seen in FIG. 10, thereby restraining and cradling the passenger.

Figure 11:
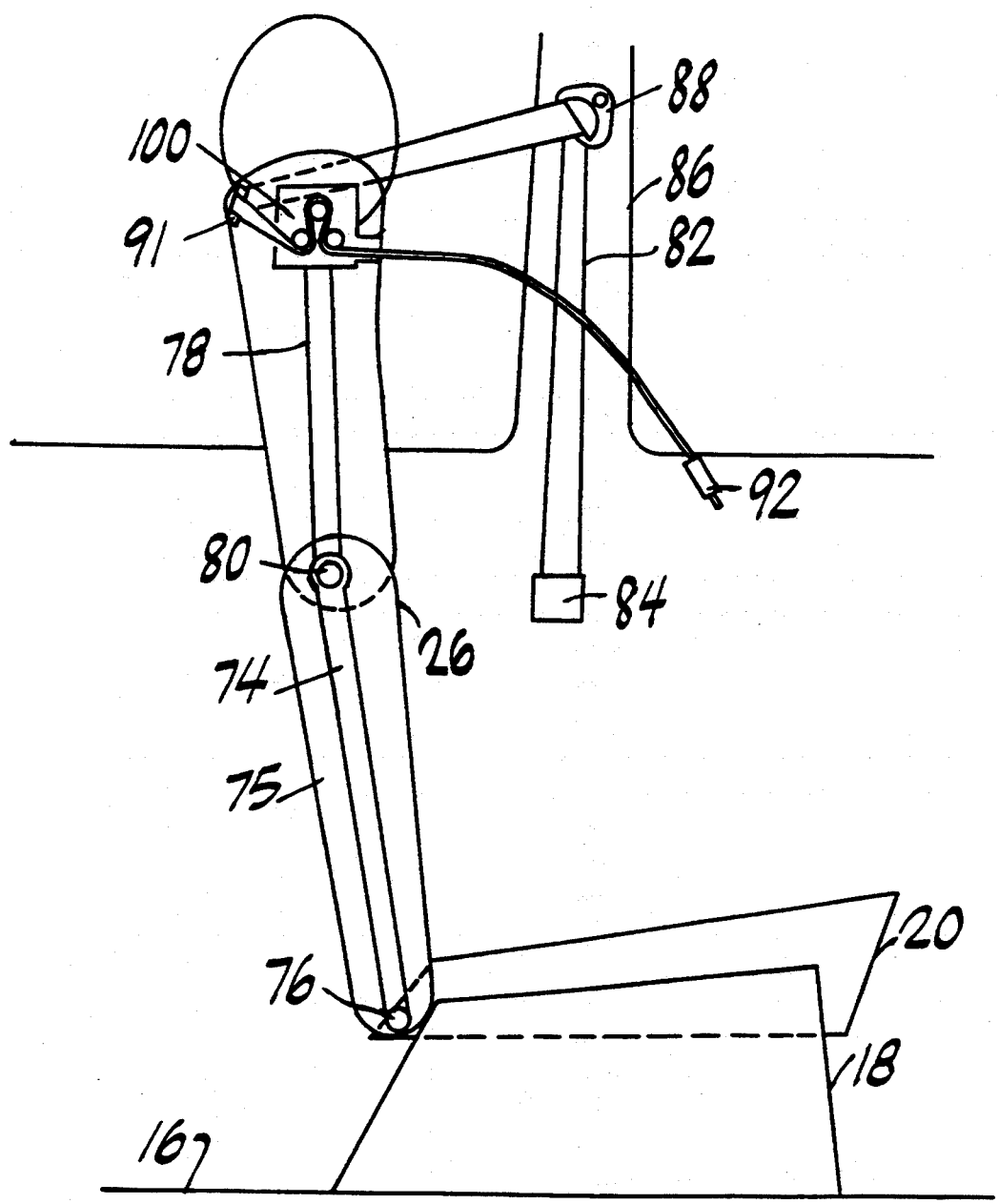
FIG. 11 shows a side view of a seat according to a sixth embodiment of the present invention wherein the seat is in an initial rest position.
Figure 12:
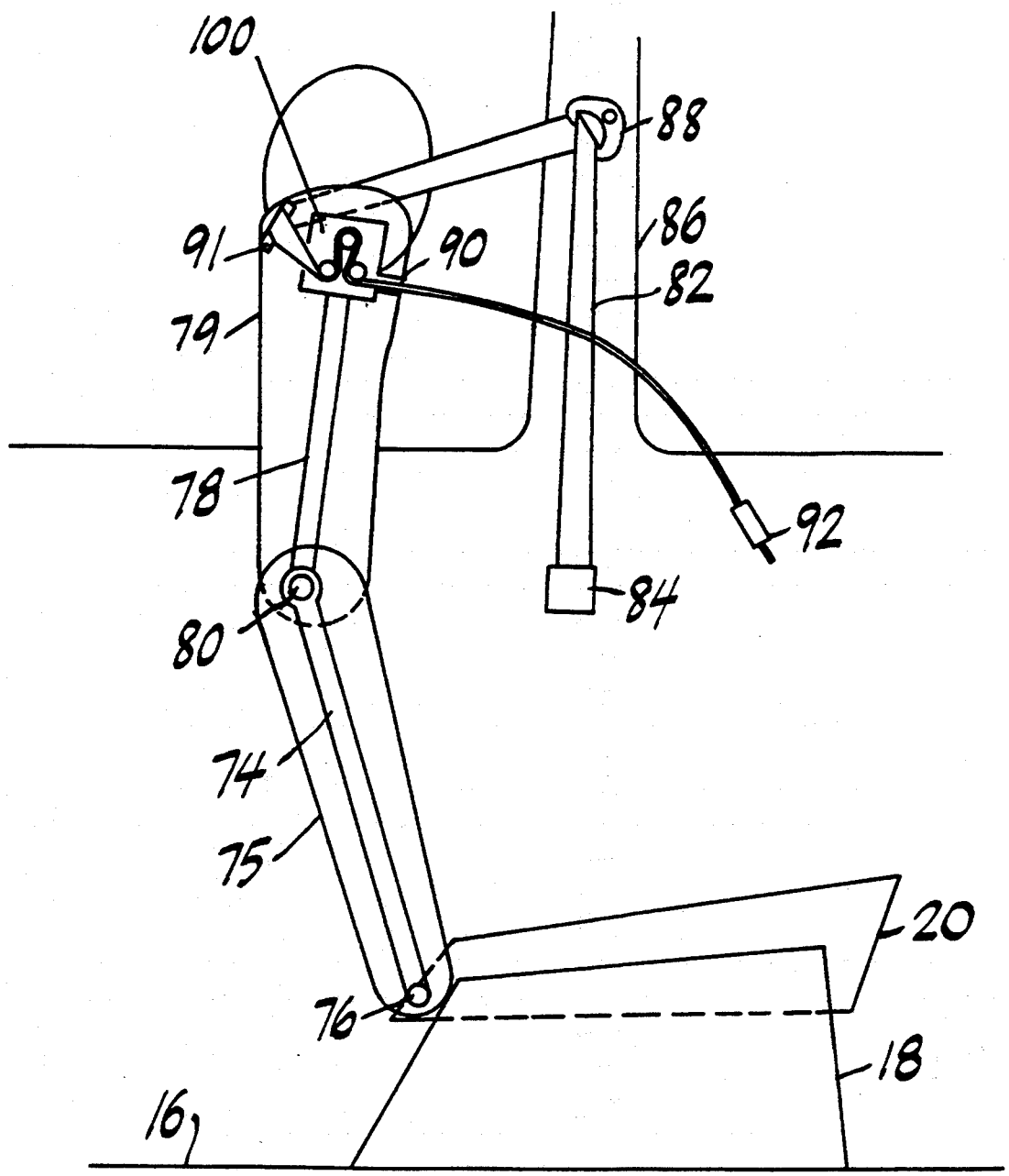
FIG. 12 shows a side view of a seat according to the sixth embodiment of the present invention wherein the seat is in a second position responsive to a sudden acceleration of the vehicle.
Figure 13:
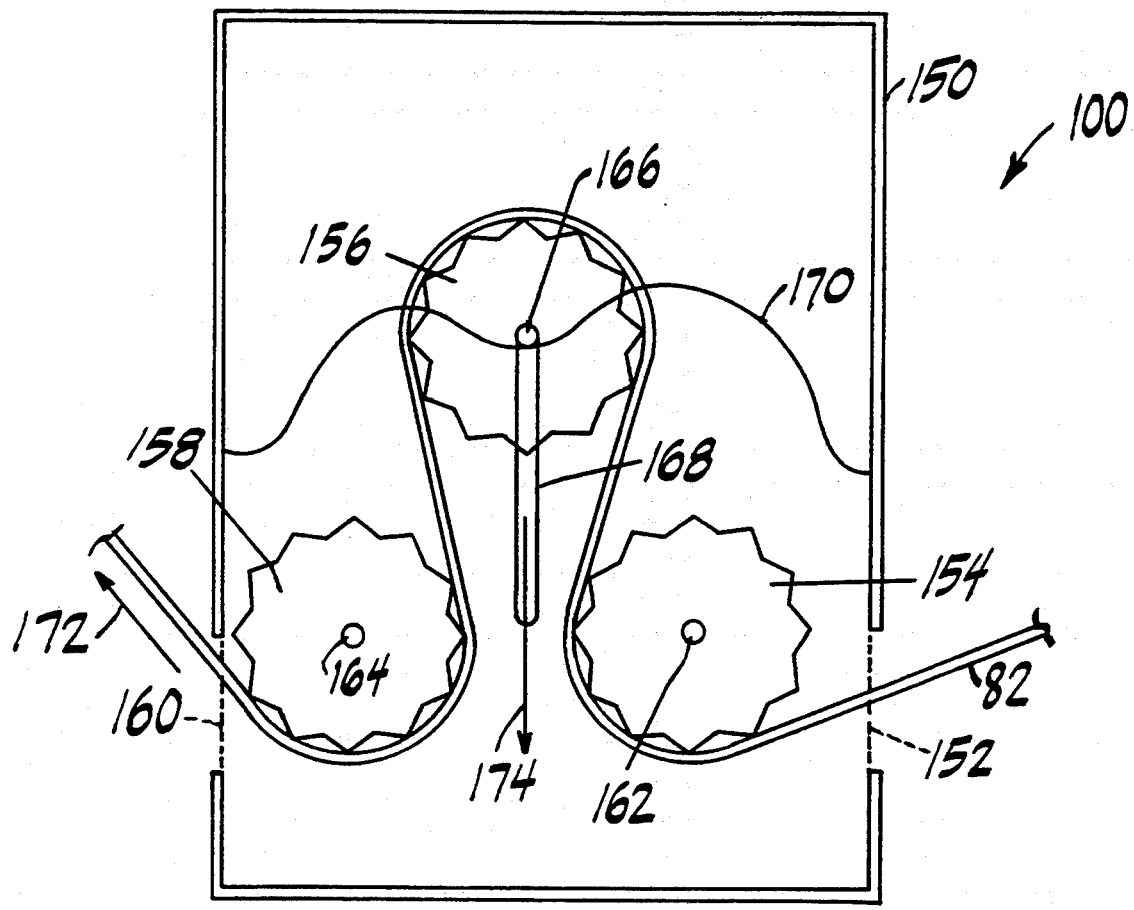
FIG. 13 shows a web lock mechanism which may be used in conjunction with a seat according to the sixth embodiment of the present invention.

A seat 10 according to a sixth embodiment of the present invention is shown in FIGS. 11-13. The seat base 20 is coupled to the member 18 which is coupled to the vehicle frame 16. The lower end of a bar 74, which is coupled to a lower portion 75 of the seat back 26, is rotatably coupled to the seat base 20 by means of a pin 76. The upper end of the bar 74 is rotatably coupled to the lower end of a bar 78 by means of a pin 80. The bar 78 is coupled to an upper portion 79 of the seat back 26. A seat belt 82 extends from a retractor 84, which is mounted to an upper portion 86 of the vehicle frame 16, to an anchor 88 coupled to the upper portion 86 and around a member 91 to enter a channel 90 which passes through the seat back 26 via a hole in the rear surface of the seat back. The seat belt 82, which includes a tongue member 92, may be drawn from the retractor 84 across the body of a passenger seated in the seat 10 and coupled about the passenger's body by means of a buckle (not shown) which is coupled to the vehicle frame 16. In addition, a web lock mechanism 100, as shown in FIG. 13, may be mounted within the channel 90 for preventing extension of the seat belt 82 through the channel 90 in the event of a sudden acceleration of the vehicle. The web lock mechanism 100 may be mounted to the bar 78. A known web lock mechanism (not shown) is coupled to the retractor 84 and prevents the extension of the belt 82 from the retractor 84 in the event of a sudden acceleration of the vehicle. Those skilled in the art will recognize that by altering the spring constant of the spring 170 a desired extension of the belt 82 through the web lock 100 may be achieved before the web lock mechanism is engaged.

It is noted that, even if no web lock mechanism is provided within the channel 90 in the seat back 26, so long as the belt 82 is locked at retractor 84, the operation of this seat will be substantially similar to that of the above-described embodiment.

Upon the sudden acceleration of the vehicle in excess of a predetermined threshold magnitude in the direction of arrow 21, a passenger seated in the seat 10 will exert an inertial force on the seat back 26 in a direction opposite the arrow 21. This force urges the seat back 26 to move rearward. In addition, as the inertial force of the passenger urges the seat back 26 rearward, the web lock mechanism in the retractor 84 operates to immediately prevent further extension of the belt 82 from the retractor 84. As the seat back 26 and, consequently, the member 91 move rearward, the length of the portion of the belt 82 which extends from the retractor 84 to the member 91 increases. Thus, as the total length of the belt 82 is fixed when the web lock mechanism in the retractor 84 is activated, rearward motion of the seat back 26 tightens the belt 82 about the passenger. The web lock 100 is designed to allow a predetermined tensioning of the belt 82 about the passenger before being activated to lock the belt 82 in the channel 90. Once the web lock mechanism 100 is activated, the length of the portion of the belt 82 extending from the retractor 84 to the member 91 is fixed and the belt 82 serves to maintain the upper portion 79 of the seat back 26 in position. As the lower portion 75 is not similarly restrained, the upper portion 79 is held in a position which is further forward than the lower portion 75, thereby cradling the passenger and reducing the risk of the passenger being thrown over the seat back 26 in the event of a collision from the rear of the vehicle. In addition, this anchoring of the belt 82 to the upper portion 79 via the member 91 provides an additional reinforcement of the seat back 26 and reduces the risk of the passenger being forced through the seat back 26 in the event of a collision from the rear of the vehicle.

Those skilled in the art will recognize that, by varying the sensitivity of the web lock mechanism 100 relative to the web lock mechanism in the retractor 84, a desired tensioning of the belt 82 about the passenger may be achieved. If the web lock mechanism 100 is designed to be activated simultaneously with the web lock mechanism in the retractor 84, no tensioning of the belt 82 about the passenger will occur. However, if no web lock mechanism 100 is included the belt 82 will continue to be tensioned about the passenger as long as the upper portion 79 of the seat back 26 continues to move rearward.

The web lock mechanism 100 depicted in detail in FIG. 13 is enclosed within a container 150. The belt 82 enters the web lock mechanism 100 through an opening 152 in the container 150 and extends around a geared wheel 154 to a geared wheel 156. The belt 82 extends around the geared wheel 156 to a geared wheel 158 and exits the web lock 100 through an opening 160 in the container 150. The geared wheels 154 and 158 are rotatably mounted to the container 150 by means of pins 162 and 164, respectively. Geared wheel 156 is mounted to a pin 166 which is rotatably and slidably mounted within a slot 168 which is formed in the container 150. A spring member 170 maintains the pin 166 at one end of the slot 168.

In order to draw the belt 82 from the web lock mechanism 100, the passenger draws the belt 82 in the direction of arrow 172 out of the container 150 through the opening 160. As the belt 82 is drawn from the web lock mechanism 100, the geared wheels 154, 156 and 158 rotate about pins 162, 166 and 164, respectively, and the belt 82 is drawn into the container 150 through the opening 152. When the belt is drawn from the web lock mechanism 100 such that, when the tension in the belt 82 is less than a predetermined limiting tension, the bias of the spring member 170 maintains the geared wheel 156 in a position remote from the geared wheels 154 and 158, thereby allowing the wheels to rotate freely and the belt to be extended from the web lock mechanism. As seen in FIGS. 11 and 12, the belt 82 is drawn to the opening 152 through the channel 90 in the seat back 26 from the anchor 88. The belt 82 is drawn to the anchor 88 from the retractor 84. However, upon a sudden acceleration of the vehicle, the inertial force of the passenger will be transmitted to the belt 82 and the belt will be tensioned in the direction of arrow 172. When this tension exceeds the predetermined tension, the bias of the spring member 170 is overcome and the geared wheel 156 is drawn through the slot 168 in the direction of arrow 174. When the teeth of the geared wheels 154, 156 and 158 come into contact, the belt 82 is tightly gripped and may not be extended further from the web lock 100 from either opening 152 or opening 160. As described above, the spring constant of the spring member 170 is chosen so that the desired sensitivity of the web lock mechanism 100 relative to the web lock mechanism in the retractor 84 is achieved.

Figure 14:
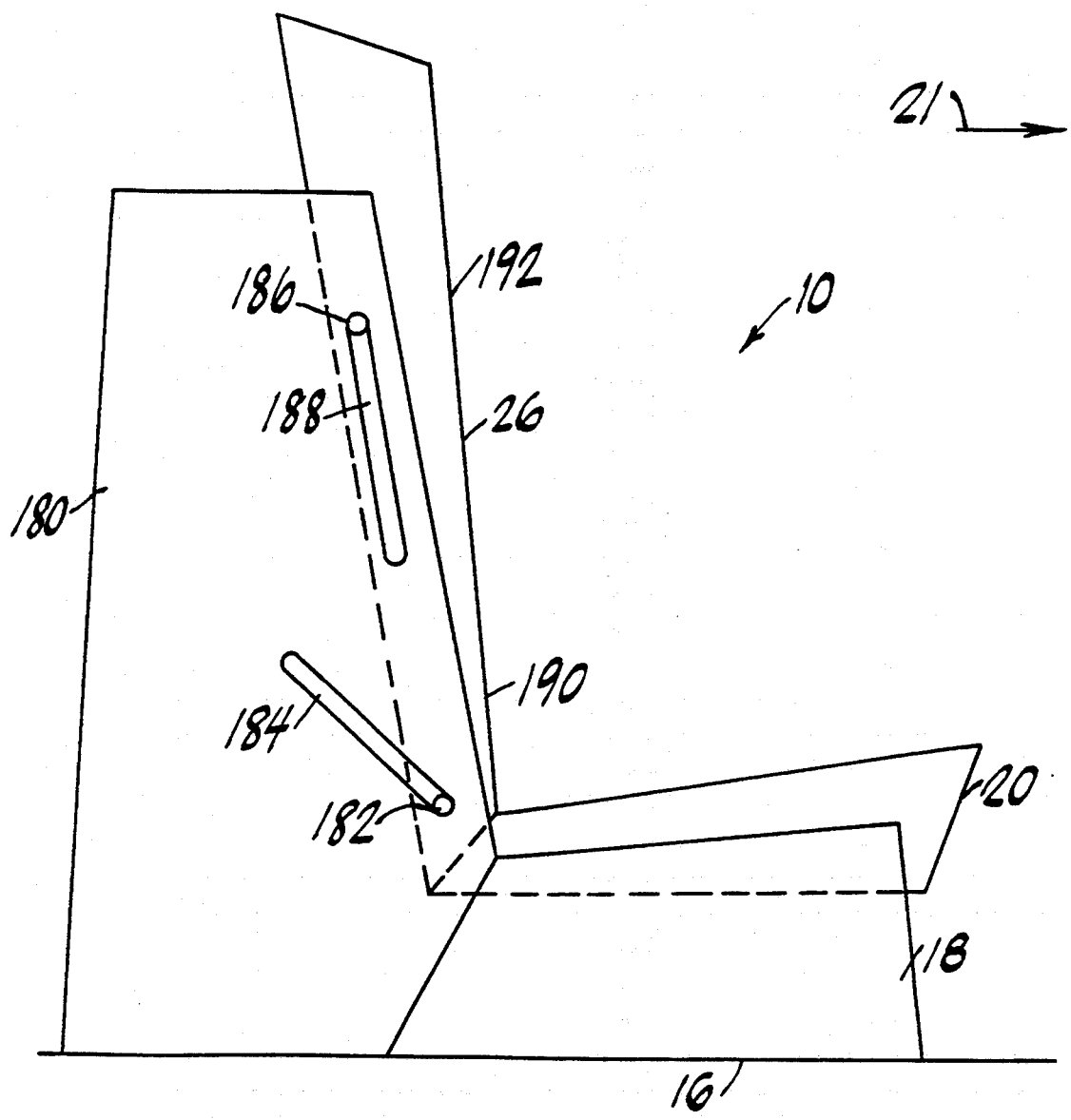
FIG. 14 shows a side view of a seat according to a seventh embodiment of the present invention wherein the seat is in an initial rest position.
Figure 15:
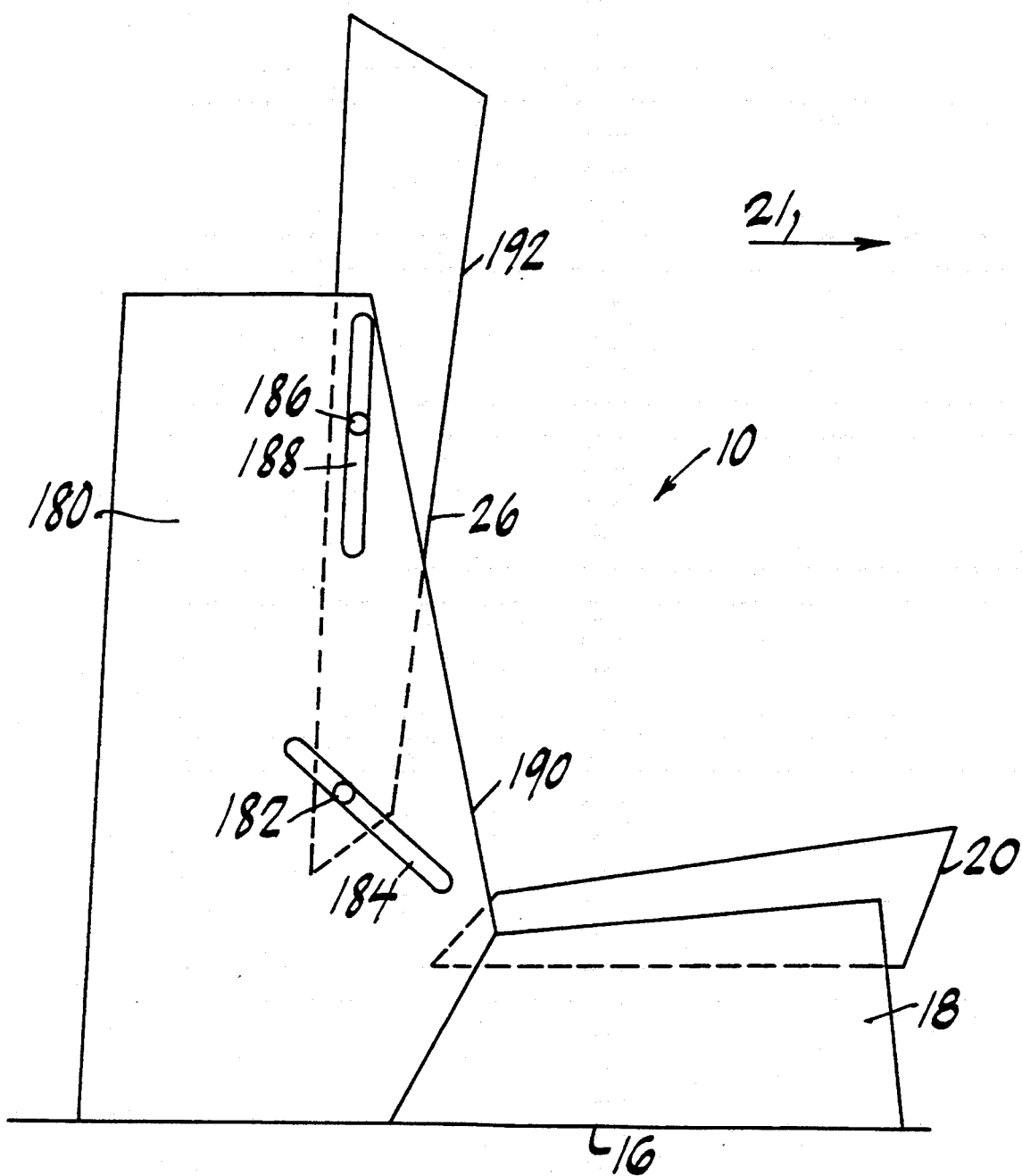
FIG. 15 shows a side view of a seat according to the seven embodiment of the present invention wherein the seat is in a second position responsive to a sudden acceleration of the vehicle.
Figure 16:
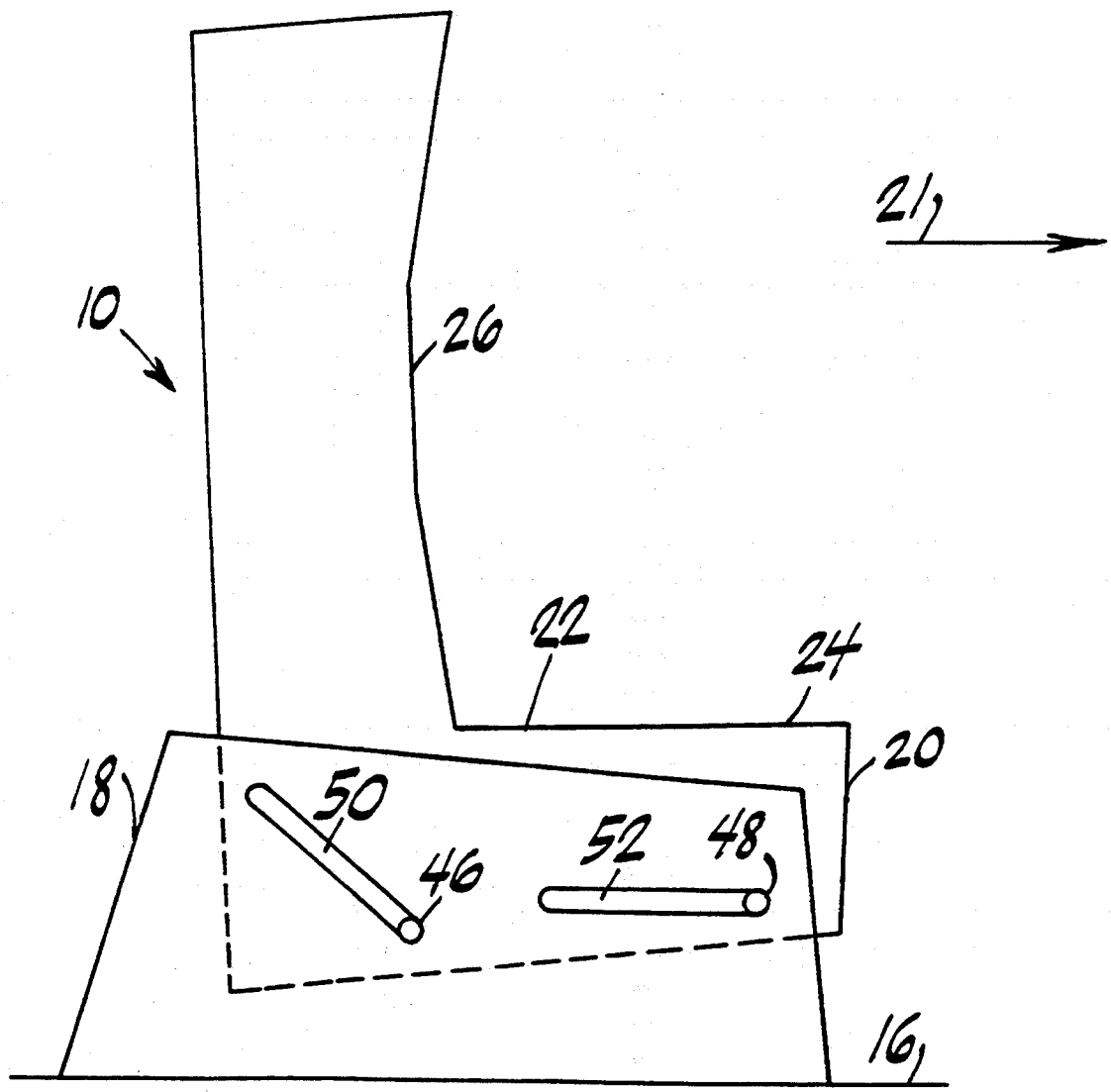
FIG. 16 shows a side view of a seat according to an eighth embodiment of the present invention, wherein, in response to a sudden acceleration of the vehicle directed from forward to rearward, a front portion of the seat base moves substantially horizontally rearward while a rear portion of the seat base moves upward and rearward, wherein the seat is in an initial position.
Figure 17:
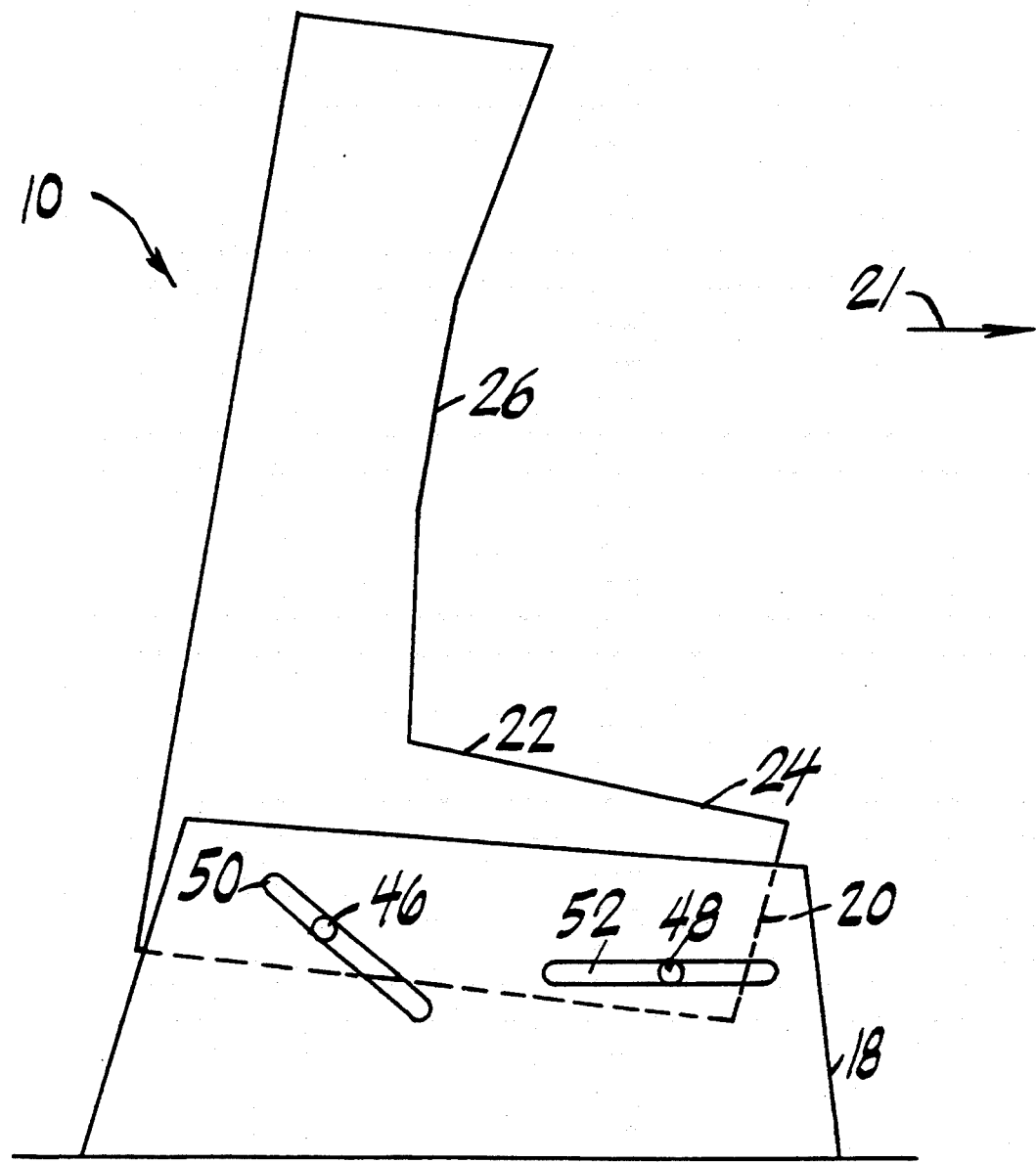
FIG. 17 shows a side view of the seat according to the eighth embodiment of the present invention wherein the seat is in a second position responsive to a sudden acceleration of the vehicle.
Figure 18:
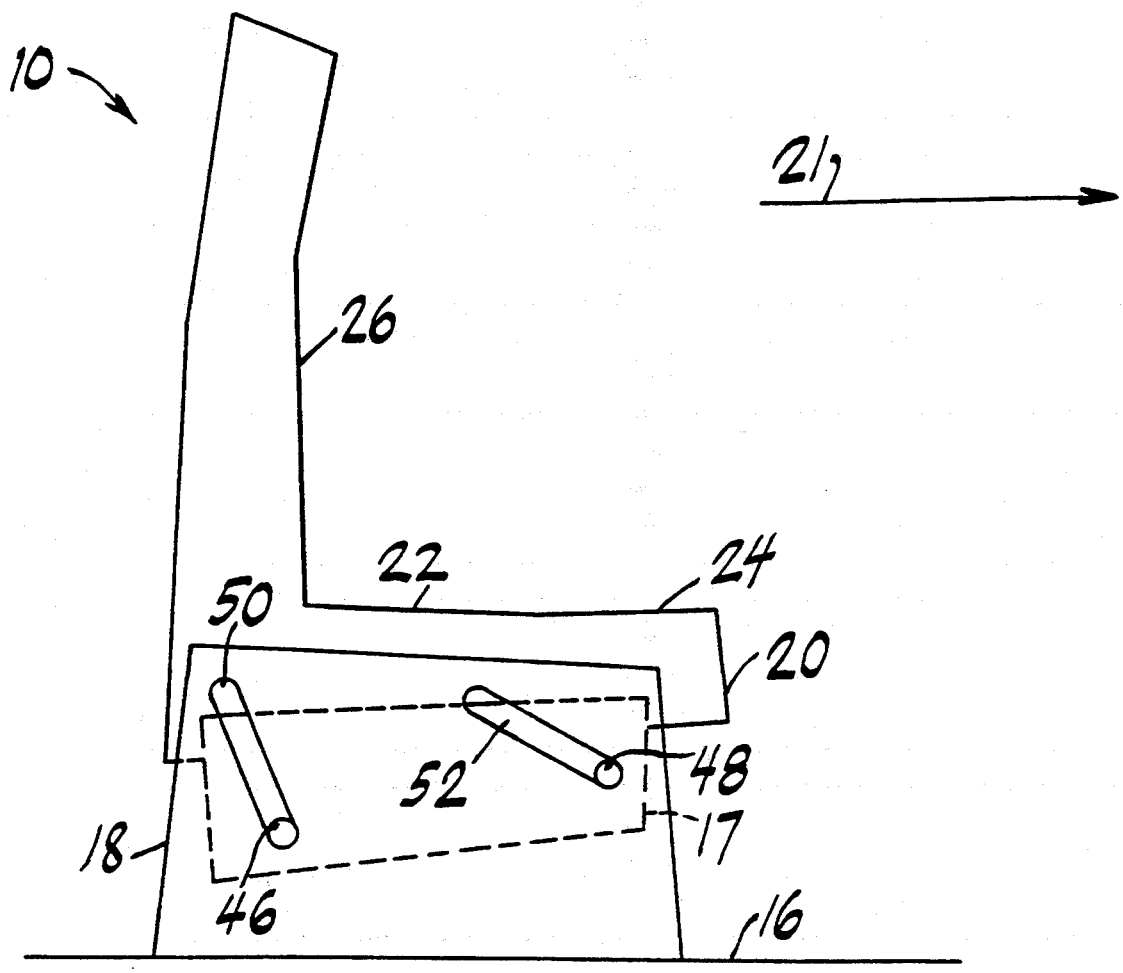
FIG. 18 shows a side view of a seat according to an ninth embodiment of the present invention, wherein, in response to a sudden acceleration of the vehicle directed from forward to rearward, both the front and rear portions of seat base move upward and rearward with the rear portion of the seat base moving upward at a greater rate than the front portion of the seat base, wherein the seat is in an initial rest position.
Figure 19:
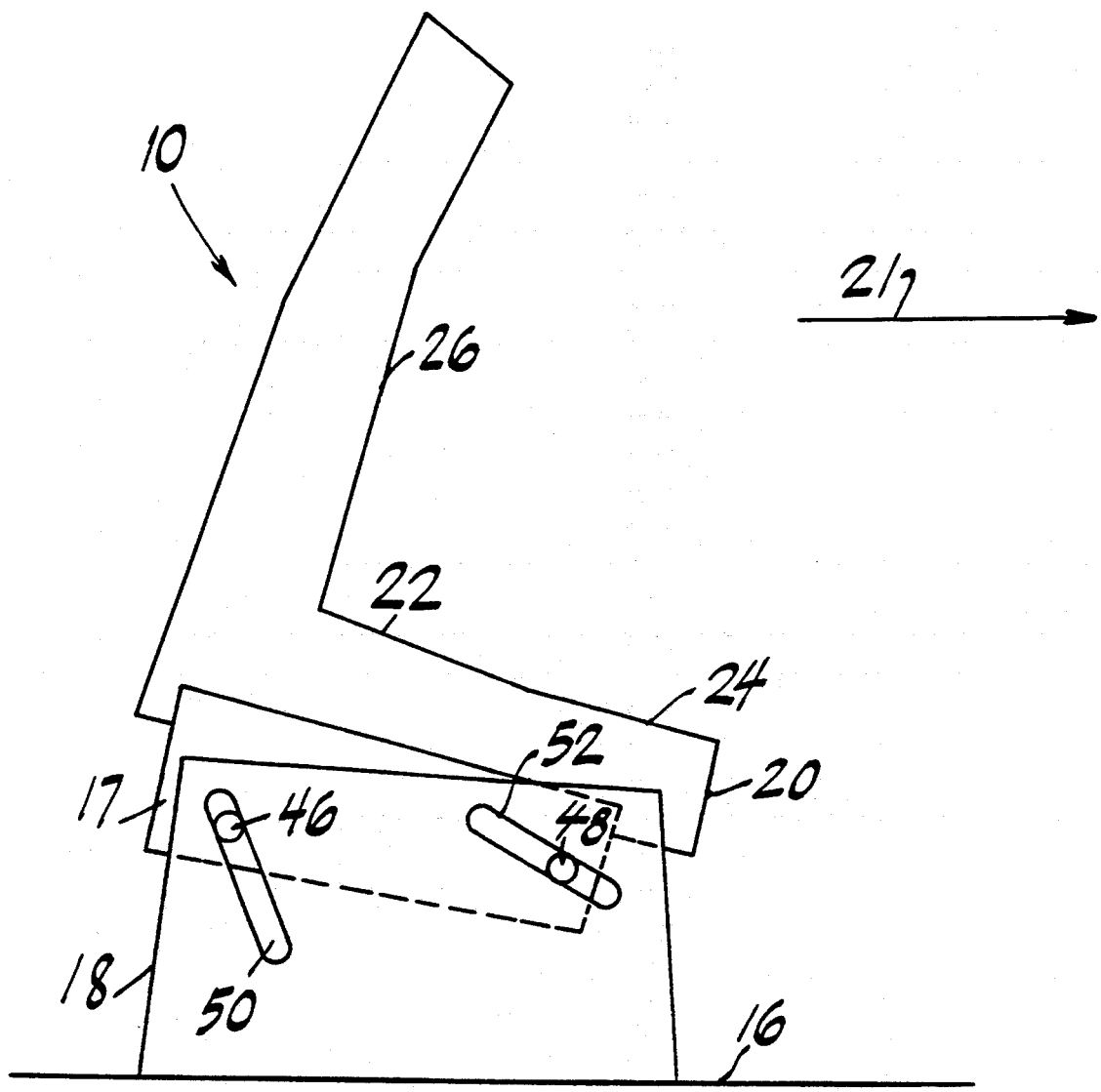
FIG. 19 shows a side view of the seat according to the ninth embodiment of the present invention wherein the seat is in a second position responsive to a sudden acceleration of the vehicle.

A seat 10 according to a seventh embodiment of the present invention is shown in FIGS. 14 and 15. The seat base 20 is rigidly coupled to the member 18 which is coupled to the vehicle frame 16. A lower portion 190 of the seat back 26 is movably coupled to a member 180 by means of a pin 182 which is slidably mounted within a slot 184 which is formed in the member 180. The member 180 is coupled to the vehicle frame 16 and to the member 16. A pin 186 is mounted to the member 180 and is slidably mounted within a slot 188 formed in an upper portion 192 of the seat back 26.

Upon the sudden acceleration of the vehicle in excess of a predetermined threshold magnitude in the direction of arrow 21, a passenger seated in the seat 10 will exert an inertial force on the seat back 26 in a direction opposite the arrow 21. This force urges the seat back 26 to move rearward. Thus, as seen in FIG. 15, the lower portion 190 of the seat back 26 separates from the seat base 20 as the pin 182 moves rearward along the slot 184. As the pin 182 and the lower portion 190 move rearward and upward in the direction of the slot 184, the upper portion 192 and the slot 188 move upward relative to the pin 186. This causes the seat back 26 to move rearward and rotate clockwise, as seen in FIG. 15, thereby restraining and cradling the passenger.

The motion of the seat according to the present invention is described in regard to a collision from the rear of the vehicle. However, those skilled in the art will recognize that all of the embodiments of the present invention are effective for the restraint of a passenger in a vehicle subject to a sudden acceleration which is directed forward relative to the passenger's body when seated in the seat. The seat according to the present invention is effective for the restraint of a passenger in response to such an acceleration regardless of the orientation of the seat relative to the vehicle.

In addition, although each of the embodiments of the present invention described herein is directed to a seat for supporting a passenger in a vehicle, those skilled in the art will recognize that the present invention may be practiced to reduce injury to any object transported in a vehicle or which is subject to a potentially harmful acceleration.

What is claimed is:

1. A seat for supporting a passenger in a vehicle comprising a seat base including front and rear portions, wherein the front portion of the seat base is movably coupled to a vehicle by a first linkage and the rear portion of the seat base is movably coupled to the vehicle by a second linkage such that, upon a sudden acceleration of the vehicle, at least a portion of the acceleration being directed from rearward to forward relative to the orientation of the seat base and having a magnitude greater than a first predetermined threshold level, the seat base moves rearward away from a rest position, the first linkage controlling the movement of the front portion of the seat base along a first predetermined path and the second linkage controlling movement of the rear portion of the seat base along a second predetermined path, wherein the first and second paths are oriented such that, as the seat base travels further from the rest position, the elevation of the rear portion of the seat base increases relative to the elevation of the front portion of the seat base wherein one of the first and second paths is oriented so that one of the front and rear portions of the seat base does not rise.

2. A seat according to claim 1 wherein the first path is oriented such that the front portion of the seat base moves substantially horizontally as the seat base moves further from the rest position.

3. A seat according to claim 1 wherein the first path is oriented such that the front portion of the seat base moves downward as the seat base moves further from the rest position.

4. A seat according to claim 1 wherein the front portion of the seat base is rotatably coupled to one end of a front linkage member and the rear portion of the seat base is rotatably coupled to one end of a rear linkage member and wherein the other end of the front linkage member and the other end of the rear linkage member are rotatably coupled to a vehicle frame.

5. A seat according to claim 1 wherein the front portion of the seat base is coupled to one end of a front deformable member and the rear portion of the seat base is coupled to one end of a rear deformable member and wherein the other end of the front deformable member and the other end of the rear deformable member are rigidly coupled to a vehicle frame and wherein, upon the sudden acceleration of the vehicle, the front deformable member deforms in a predetermined manner such that the front portion of the seat base moves along at least a portion of the first predetermined path and the rear deformable member deforms such that the rear portion of the seat base moves along at least a portion of the second predetermined path.

6. A seat according to claim 1 further comprising a plate member rigidly coupled to a vehicle frame, wherein the first and second linkages include front and rear slots, respectively, formed in the plate member and wherein the first linkage further includes a first pin coupled to the front portion of the seat base, the front pin being received in the front slot and wherein the second linkage further includes a second pin coupled to the rear portion of the seat base, so that, upon the sudden acceleration of the vehicle, the first pin moves along the front slot such that the front portion of the seat base moves along at least a portion of the first predetermined path and the second pin moves along the rear slot such that the rear portion of the seat base moves along at least a portion of the second predetermined path.

7. A seat according to claim 1 wherein the first predetermined path is substantially linear and wherein the second predetermined path is substantially linear.

8. A seat according to claim 1 wherein the first predetermined path is a portion of a conic section.

9. A seat according to claim 1 wherein the second predetermined path is a portion of a conic section.

10. A seat according to claim 1, wherein the first linkage includes a pin and slot connection between the front portion of the seat base and a vehicle frame.

11. A seat according to claim 1, wherein the first linkage includes a front bar, one end of which is rotatably coupled to the front portion of the seat base, wherein the other end of the front bar is rotatably coupled to a vehicle frame.

12. A seat according to claim 1, wherein the second linkage includes a pin and slot connection between the rear portion of the seat base and a vehicle frame.

13. A seat according to claim 1, wherein the second linkage includes a rear bar, one end of which is rotatably coupled to the rear portion of the seat base, wherein the other end of the rear bar is rotatably coupled to a vehicle frame.

14. A seat according to claim 1 wherein the first linkage includes at least one deformable link member coupled between the front portion of the seat base and a vehicle frame.

15. A seat according to claim 1 wherein the second linkage includes at least one deformable link member coupled between the rear portion of the seat base and a vehicle frame.

16. A seat for supporting a passenger in a vehicle comprising a seat base including front and rear portions, wherein the seat base is coupled to a vehicle by a first linkage such that, upon a sudden acceleration of the vehicle of a magnitude greater than a predetermined threshold level, the seat base moves rearward away from a rest position, the front portion of the seat base moving along a path extending substantially linearly downward, and the rear portion of the seat moving along a path extending substantially elliptically upward.

* * * * *

UNITED STATES PATENT AND TRADEMARK OFFICE
CERTIFICATE OF CORRECTION

PATENT NO. : 5,437,494
DATED : August 1, 1995
INVENTOR(S) : Randall R. Beauvais

It is certified that error appears in the above-indentified patent and that said Letters Patent is hereby corrected as shown below:

| Column | Line | |
|---|---|---|
| 2 | 47 | Change "hows" to --shows--. |
| 3 | 31 | After "initial" insert --rest--. |

Signed and Sealed this

Twelfth Day of December, 1995

Attest:

BRUCE LEHMAN

Attesting Officer

Commissioner of Patents and Trademarks